United States Patent Office 3,502,694
Patented Mar. 24, 1970

3,502,694
1,3,5-BENZOXADIAZEPINES
George Francis Field, West Caldwell, and Leo Henryk Sternbach, Upper Montclair, N.J., assignors to Hoffmann-La Roche Inc., Nutley, N.J., a corporation of New Jersey
No Drawing. Filed Sept. 5, 1967, Ser. No. 665,306
Int. Cl. C07d 51/00
U.S. Cl. 260—333                        3 Claims

---

ABSTRACT OF THE DISCLOSURE 1,3,5-benzoxadiazepines which are useful as antibacterial agents.

---

SUMMARY OF THE INVENTION

In accordance with this invention, we have found that compounds of the formula

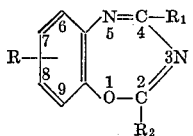

and pharmaceutically acceptable salts thereof, wherein R is hydrogen, halogen, lower alkyl, nitro and trifluoromethyl; $R_1$ is selected from the group consisting of hydrogen, lower alkyl, $-C_nH_{2n}X$, $-C_nH_{2n}-$

phenyl, $R_2$ is selected from the group consisting of phenyl, lower alkyl substituted phenyl, halo substituted phenyl, pyridyl and nitro substituted phenyl, $R_4$ and $R_5$ are selected from the group consisting of hydrogen and lower alkyl and $R_4$ and $R_5$ together with their attached nitrogen atom form a 5 or 6 membered heterocyclic ring; and $n$ is an integer from 1 to 6, are effective as antibacterial agents against such microorganisms as *D. pneumonia*, and *S. agalactiae*. Hence the compounds of formula I above are useful as disinfecting agents against various microorganisms such as *D. pneumonia* and *S. agalactiae*.

The compounds of Formula I are prepared in accordance with this invention by subjecting a quinazoline compound of the formula:

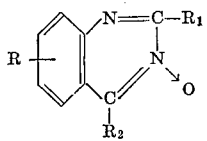

wherein R, $R_1$ and $R_2$ are as above to irradition by ultra-violet light.

Also included within the purview of the present invention are the acid addition salts of the novel 1,3,5-benzoxadiazepines of Formula I above. More particularly, the compounds of Formula I above, form acid addition salts with pharmaceutically acceptible organic and inorganic acids, such as hydrochloric acid, hydrobromic acid, nitric acid, sulfuric acid, acetic acid, formic acid, succinic acid, maleic acid, p-toluene sulfonic acid, and the like.

DETAILED DESCRIPTION OF THE INVENTION

The numbering of the 1,3,5-benzoxadiazepine ring in Formula I above is shown for purposes of convenience. As used herein the term "lower alkyl" includes both straight and branced chain alkyl groups having from one to seven carbon atoms, such as methyl, ethyl, propyl, isopropyl and the like. The term "halogen" includes bromine, chlorine, fluorine and iodine.

The preferred 1,3,5-benzoxadiazepines of Formula I above are those compounds where R is hydrogen or a halo substituent in the 8-position. When R is a halogen, the preferred halogens are chlorine and bromine. $R_1$ in accordance with a preferred embodiment of this invention, is a lower alkyl radical such as, methyl or ethyl. When the benzoxadiazepines of Formula I contain an amino group in the 4-position, i.e., when $R_1$ is

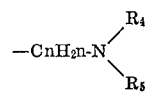

The preferred amino group are ethylamino, methylamino, isopropylamino, diethylamino, pyrrolidino, and piperidino.

In accordance with the preferred embodiment of this invention, $R_2$ is either phenyl, 2-pyridyl or phenyl substituted on the 2-position with a halogen such as chlorine or fluorine.

The benzoxadiazepines of Formula I above are useful in various cleaning, protective coatings and other product formulations to provide inhibition of microbial growths. These benzoxadiazepines can be applied to the surfaces to destroy microbial growth by means of organic solvents such as ethanol. Furthermore, the benzoxadiazepines of this invention can be utilized in the formulation of commercial detergents such as laundry or dishwashing detergents. These benzoxadiazepines can be used in combination with any conventional anionic or noioic detergents.

The compounds of Formula I above are effective antibacterial agents against a variety of microorganisms. For example by the minimum inhibitory concentrations (MIC) in mcg./ml. determined in vitro by the serial broth dilution method utilizing a trypticase soy broth for 8-chloro-4-methyl-2-phenyl-1,3,5 - benzoxadiazepine was 2,500 for *S. pyogenes*, 1,254 for *D. pneumoniae*, 5,000 for *E. insidiosa*, 1,254 for *P. multocida* and 2,500 for *S. agalactiae*. Furthermore, a compound such as 2,4-diphenyl-1,3,5-benzoxadiazepine had a minimum inhibitory concentration in mcg./ml. as measured by the same test of 5,000 for *D. pneumoniae*, 156 for *E. insidiosa*, 2,500 for *S. agalactiae*.

Compounds of Formula I above, are prepared from the compounds of Formula II above, by subjecting the compounds of Formula II above to irradiation by ultraviolet light. Generally, this reaction is carried out in the presence of an inert organic solvent. Any conventional inert organic solvent can be utilized to carry out this reaction. Among the preferred inert organic solvents which are utilized in accordance with this invention are included hexane, benzene, diethylether, tetrahydrofuran, pentane, ethylpropylether, and mixtures thereof. The conversion of the compounds of Formula II above into the compounds of Formula I above can be carried out by utilizing any conventional ultraviolet light source. Generally, it is preferable to expose the compound of Formula II above to an ultraviolet light for a period from about 2 hours to about 3 days. By utilizing longer exposure time better conversion rates are obtained. However, it is seldom necessary to utilize exposure times greater than 5 days. Since no additional beneficial results are achieved by utilizing such long exposure times. In carrying out this reaction, temperatures of from $-10°$ C. to about $150°$ C. can be utilized. Generally, it is preferred to carry out this reaction at room temperature.

The invention is further illustrated by the following ex-

EXAMPLE 1

A solution of 10 g. of 2,4-diphenylquinazoline 3-oxide in 1.4 liters of benzene was irradiated with a Hanovia 200 watt medium pressure lamp for 3 days. The crystalline residue left on concentration of the solution in vacuo, was collected and washed with ether to give 2,4-diphenyl-1,3,5-benzoxadiazepine.

EXAMPLE 2

A solution of 10 g. of 2-methyl-4-phenylquinazoline 3-oxide in 1.4 liters of benzene was irradiated with a Hanovia 200 watt medium pressure lamp for 4 days. The residue left on concentration of the solution in vacuo was crystallized from hexane to give 4-methyl-2-phenyl-1,3,5-benzoxadiazepine.

EXAMPLE 3

A solution of 10 g. of 6-chloro-2-methyl-4-phenyl quinazoline 3-oxide in 1.4 liters of benzene was irradiated with a Hanovia 200 watt medium pressure lamp with a Pyrex filter for 70 hours. The benzene was removed in vacuo and the residue crystallized from ether to give 8-chloro-4-methyl-2-phenyl-1,3,5-benzoxadiazepine.

What is claimed is:

1. A compound selected from the group consisting of compounds of the formula

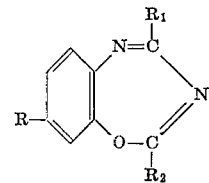

and pharmaceutically acceptable salts thereof wherein R is hydrogen and halogen; $R_1$ is lower alkyl and phenyl and $R_2$ is phenyl.

2. The compound of claim 1 wherein said compound is 8-chloro-4-methyl-2-phenyl-1,3,5-benzoxadiazepine.

3. The compound of claim 1 wherein said compound is 2,4-diphenyl-1,3,5-benzoxadiazepine.

No references cited.

NORMA S. MILESTONE, Primary Examiner

U.S. Cl. X.R.

204—158; 260—251, 256.4, 294.7, 296, 236.5, 999